United States Patent
Bartelt

[19]

[11] Patent Number: 6,089,804
[45] Date of Patent: Jul. 18, 2000

[54] MODULAR TRUCK BED DIVIDER SYSTEM

[76] Inventor: Maynard W. Bartelt, W1295 Pine Lake, Campbellsport, Wis. 53010

[21] Appl. No.: 09/157,358

[22] Filed: Sep. 19, 1998

[51] Int. Cl.[7] ........................................................ B60P 7/08
[52] U.S. Cl. .......................... 410/140; 410/121; 410/129; 410/143
[58] Field of Search .................................. 410/121, 129, 410/140, 143, 144, 145, 150; 296/3; 224/403, 42.33, 42.34, 552; 220/528, 529

[56] References Cited

U.S. PATENT DOCUMENTS

| | | | |
|---|---|---|---|
| 4,236,854 | 12/1980 | Rogers | 410/121 |
| 4,492,499 | 1/1985 | Gasper | 410/143 X |
| 4,770,579 | 9/1988 | Aksamit | 410/150 |
| 4,772,165 | 9/1988 | Bartkus | 410/145 X |
| 4,917,429 | 4/1990 | Giger . | |
| 5,265,993 | 11/1993 | Wayne | 410/129 |
| 5,427,487 | 6/1995 | Brosfske | 410/121 |
| 5,439,152 | 8/1995 | Campbell | 296/3 X |
| 5,443,586 | 8/1995 | Cargill | 410/143 |
| 5,526,972 | 6/1996 | Frazier et al. . | |
| 5,697,742 | 12/1997 | House | 410/140 X |

FOREIGN PATENT DOCUMENTS

| | | | |
|---|---|---|---|
| 4015556A | 11/1990 | Germany | 224/42.34 |

*Primary Examiner*—Stephen T. Gordon
*Attorney, Agent, or Firm*—Donald J. Ersler

[57] ABSTRACT

A modular truck bed divider system includes a plurality of modular dividers and a plurality of fasteners. The modular divider has a first leg and a second leg which is substantially perpendicular to the first leg. A plurality of openings are formed along the length of the first and second legs. The cross section of the modular divider is preferably the shape of a channel. To install the modular truck bed divider system, a plurality of modular dividers are arranged in a pick-up truck bed in such a fashion that they form a particular set of compartments. Once the compartment configuration is decided upon, the plurality of modular dividers are attached to each other with the plurality of fasteners.

20 Claims, 3 Drawing Sheets

MODULAR TRUCK BED DIVIDER SYSTEM

BACKGROUND OF THE INVENTION

1. Field of the Invention

The present invention relates generally to pick-up truck beds and more specifically to a modular truck bed divider system which allows a pick-up truck bed to be divided into different compartment combinations for the storage of various items, such as sandbags.

2. Discussion of the Prior Art

A problem frequently encountered with pick-up truck beds is movement of items placed therein. There have been at least three attempts to address this problem. U.S. Pat. No. 4,917,429 to Giger discloses a portable divider assembly for dividing a pick-up truck bed into a set number of compartments. The above design has at least one drawback, each pick-up truck bed varies in size. A different set of dividers must be manufactured for each size pickup truck bed. U.S. Pat. No. 5,427,487 to Brosfske discloses a stabilizer kit for installation in a pick-up truck to secure loads in the bed. The above design has at least one drawback, the side rails must be bolted to the side of the bed. U.S. Pat. No. 5,526,972 to Frazier, et al. discloses a partition for a pick-up truck bed. The above design has at least two drawbacks, first the device must be manufactured in different sizes for different size truck beds. Second, the device would slide in a pick-up truck with a step bed. The step bed does not have wheel wells to retain the partition.

Accordingly, there is a clearly felt need in the art for a modular truck bed divider system which may be used in any size truck, does not require bolting to the side of a truck bed, and allows many different compartment combinations.

SUMMARY OF THE INVENTION

The primary objective of the present invention is to provide a modular truck bed divider system which may be used in any size truck, does not require bolting to the side of a truck bed, and allows many different compartment combinations.

According to the present invention, a modular truck bed divider system includes a plurality of modular dividers and a plurality of fasteners. The modular divider has a first leg and a second leg which is substantially perpendicular to the first leg. A plurality of openings are formed along the length of the first and second legs. The cross section of the modular divider is preferably the shape of a channel. The channel cross-sectional shape allows a thinner thickness of material to be used than a flat cross-sectional shape would allow.

To install the modular truck bed divider system, a plurality of modular dividers are arranged in a pick-up truck bed in such a fashion that they form a particular set of compartments. Once the compartment configuration is decided upon, the plurality of modular dividers are attached to each other with the plurality of fasteners.

Accordingly, it is an object of the present invention to provide a modular truck bed divider system which may be used in any size pick-up truck bed.

It is a further object of the present invention to provide a modular truck bed divider system which does not need to be fastened to the sides or floor of a pick-up truck bed.

It is yet a further object of the present invention to provide a modular truck bed divider system which may be arranged to form different sized compartments.

Finally, it is another object of the present invention to provide a modular truck bed divider system which may be arranged to form many different compartment combinations.

These and additional objects, advantages, features and benefits of the present invention will become apparent from the following specification.

DETAILED DESCRIPTION OF THE PREFERRED EMBODIMENTS

Figure 1:
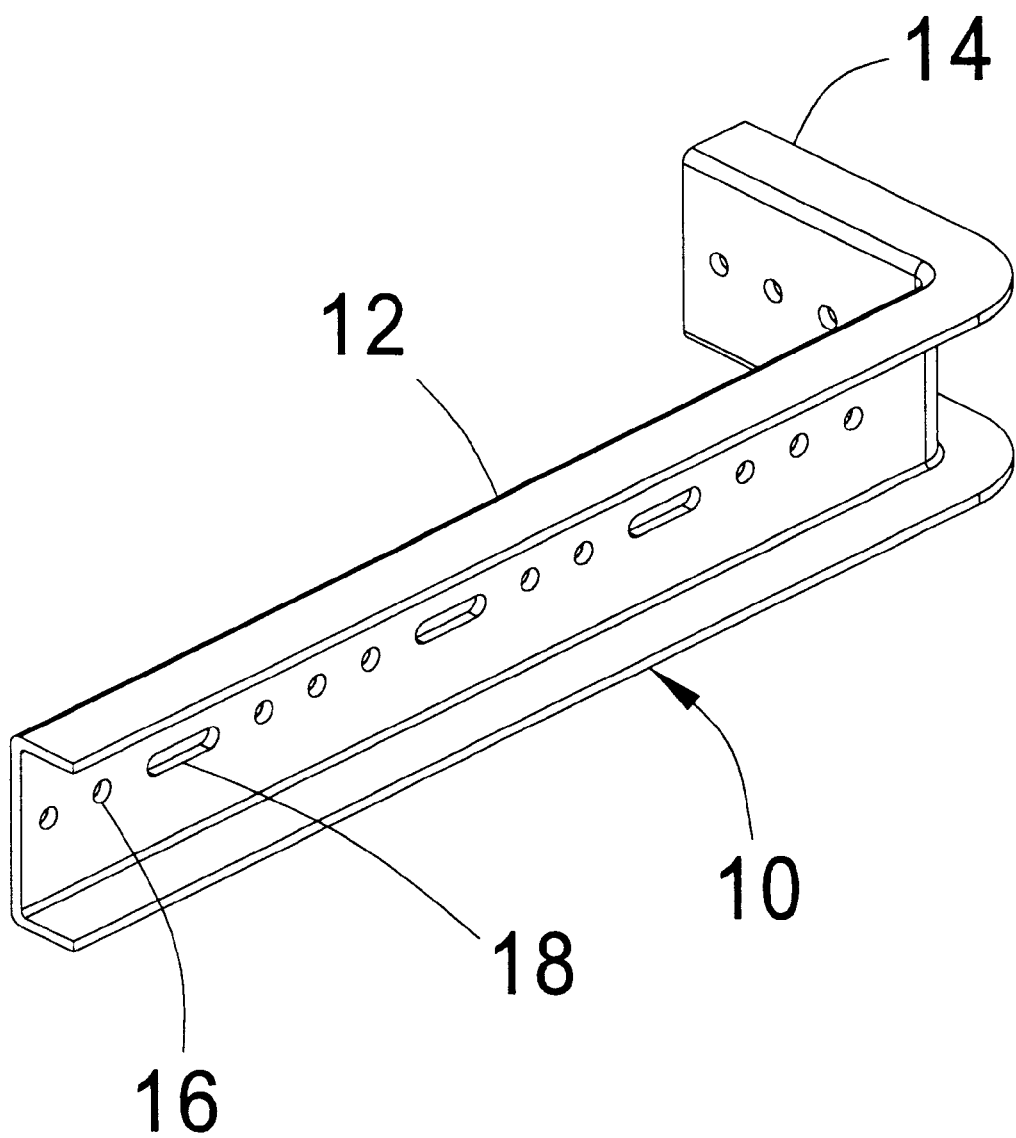
FIG. 1 is a perspective view of a modular divider in accordance with the present invention.
Figure 2:
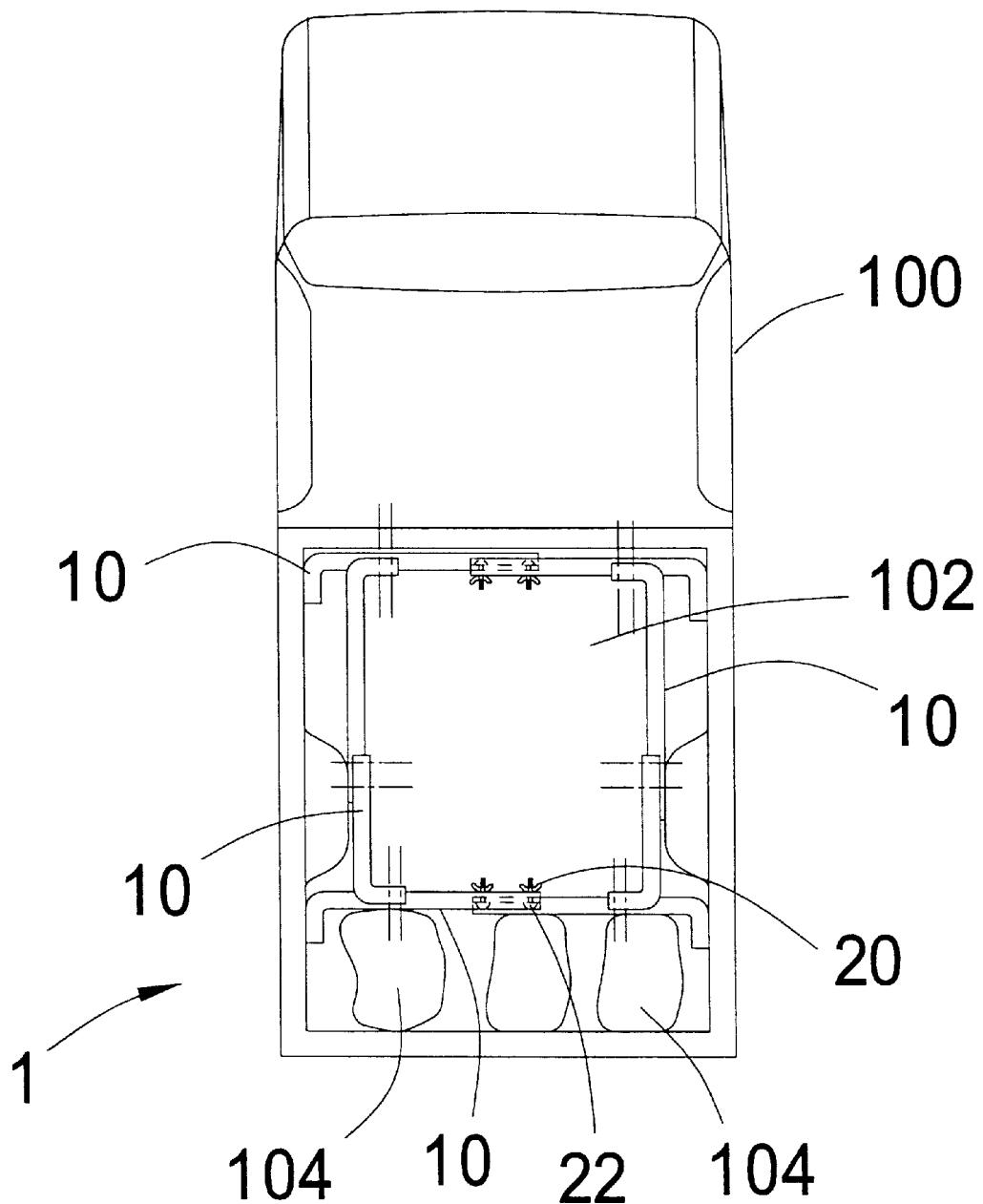
FIG. 2 is a top view of a pick-up truck with a plurality of modular dividers arranged to form a compartment for some sand bags in accordance with the present invention.

With reference now to the drawings, and particularly to figure 2, there is shown a top view of a modular truck bed divider system 1. With reference to FIG. 1, the modular truck bed divider system 1 includes a plurality of modular dividers 10 and a plurality of fasteners. A plurality of sand bags 104 are retained by the modular truck bed divider system 1 in FIG. 2. The modular divider 10 has a first leg 12 and a second leg 14 which is substantially perpendicular to the first leg 12. The modular divider 10 may be fabricated from metal, plastic, or any synthetic material. A plurality of openings 16 are formed along the length of the first and second legs. The opening 16 may be round or square in shape. The square shape will accommodate a carriage bolt. It is also possible to form a slot 18 in the modular divider 10. The slot 18 allows the plurality of modular dividers 10 to fit firmly against the sides of the truck bed 102. Openings in the modular divider 10 for the plurality of fasteners may be round openings, square openings, slots, or any combination of the previously mentioned openings.

The cross section of the modular divider 10 is preferably the shape of a channel. The channel cross-sectional shape allows a thinner thickness of material to be used as opposed to a simple rectangular cross-sectional shape. Other cross-sectional shapes may be used besides a channel such as a right angle or ribbed cross sections. In FIG. 1, the open side of the channel cross section is oriented to the outside of the modular divider 10 such that the fasteners will not scrap the rear wall of the truck bed 102 as shown in FIG. 2. It is also possible to orient the open side of the channel cross section so that it faces inside the modular divider 10, or opposite the orientation in FIG. 1.

Figure 3:
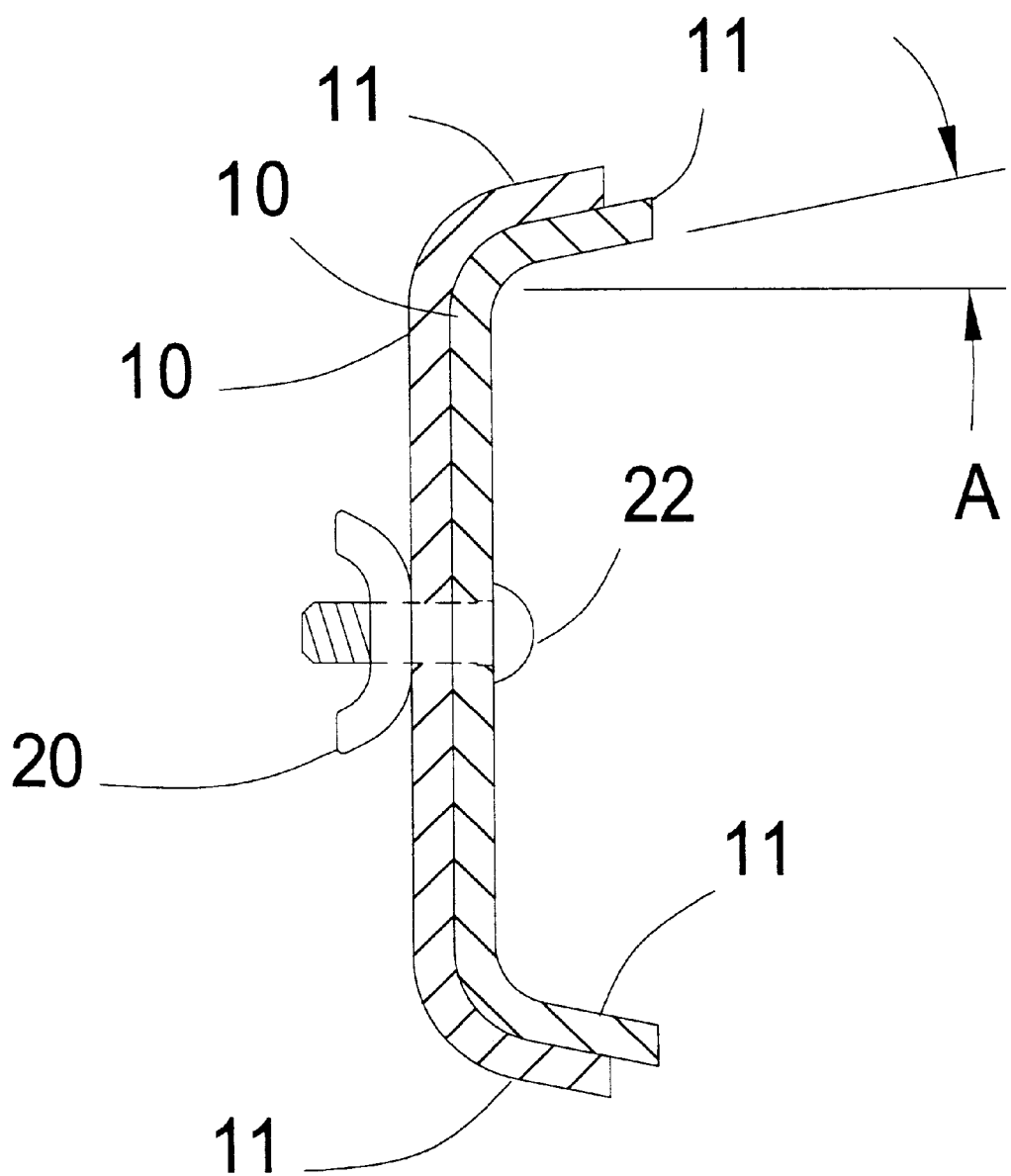
FIG. 3 is a cross sectional view of two modular dividers bolted to one another in accordance with the present invention.

With reference to FIG. 3, the channel shape preferably has a pair of tapered legs 11. The pair of tapered legs 11 allows multiple layers of modular dividers 10 to be nestled against each other. The tapered leg 11 is also beneficial if the modular dividers are fabricated utilizing plastic injection molding. It is easier to withdraw a part from a plastic mold which has greater taper. The angle of the taper A is preferably 2–3 degrees.

To install the modular truck bed divider system 1, the plurality of modular dividers 10 are arranged in the truck bed 102 of a pick-up truck 100 in such a fashion that they form a particular set of compartments. Once the compartment configuration is decided upon, the plurality of modular dividers 10 are attached to each other with the plurality of fasteners. It is preferable that the plurality of fasteners be a plurality of wing nuts 20 and a plurality of carriage bolts 22. The carriage bolt 22 does not have to be restrained from rotation when in a square opening. Other fasteners may also be used to fasten the plurality of modular dividers together such as nuts and bolts.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A modular truck bed divider system comprising:

a plurality of modular dividers, each said modular divider having a first leg and a second leg, a plurality of openings being formed in said first leg, and at least one opening being formed in said second leg;

a plurality of fasteners being used to fasten said plurality of modular dividers to each other; and at least one of said plurality of openings in said first leg being in the shape of a slot.

2. The modular truck bed divider system of claim 1, wherein:

said first leg being substantially perpendicular to said second leg.

3. The modular truck bed divider system of claim 1, wherein:

said modular divider having a cross-sectional shape of a right angle.

4. The modular truck bed divider system of claim 1, wherein:

said openings which are not shaped as a slot having a square shape.

5. The modular truck bed divider system of claim 1, wherein:

said plurality of fasteners including a wing nut and a carriage bolt.

6. The modular truck bed divider system of claim. 1, wherein:

said plurality of fasteners including a bolt and a nut.

7. The modular truck bed divider system of claim 1, wherein:

said modular divider having a cross-sectional shape of a channel.

8. The modular truck bed divider system of claim 7, wherein:

said channel having a pair of tapered legs, said tapered legs allowing at least one modular divider to be nestled against another modular divider.

9. A modular truck bed divider system comprising:

a plurality of modular dividers, each said modular divider having a first Leg and a second leg, a plurality of openings being formed in said first leg, and at least one opening being formed in said second leg;

a plurality of fasteners being used to fasten said plurality of modular dividers to each other; and said modular divider having a cross-sectional shape of a channel.

10. The modular truck bed divider system of claim 9, wherein:

said first leg being substantially perpendicular to said second leg.

11. The modular truck bed divider system of claim 9, wherein:

at least one of said plurality of openings in said first leg being in the shape of a slot.

12. The modular truck bed divider system of claim 11, wherein:

said plurality of openings which are not shaped as a slot having a square shape.

13. The modular truck bed divider system of claim 9, wherein:

said plurality of fasteners including a wing nut and a carriage bolt.

14. The modular truck bed divider system of claim 9, wherein:

said plurality of fasteners including a bolt and a nut.

15. The modular truck bed divider system of claim 9, wherein:

said channel having a pair of tapered legs, said tapered legs allowing at least one modular divider to be nestled against another modular divider.

16. The modular truck bed divider system of claim 9, wherein:

said modular divider having a cross-sectional shape of a right angle.

17. A modular truck bed divider system comprising:

a plurality of modular dividers, each said modular divider having a first leg and a second leg, a plurality of openings being formed in said first leg, and at least one opening being formed in said second leg;

a plurality of fasteners being used to fasten said plurality of modular dividers to each other for forming at least one compartment in a pick-up truck bed;

said modular divider having a cross-sectional shape of a channel, said channel having a pair of tapered legs, said tapered legs allowing at least one modular divider to be nestled against another modular divider; and said first leg being substantially perpendicular to said second leg.

18. The modular truck bed divider system of claim 17, wherein:

at least one of said plurality of openings in said first leg being in the shape of a slot.

19. The modular truck bed divider system of claim 18, wherein:

said plurality of openings which are not shaped as a slot having a square shape.

20. The modular truck bed divider system of claim 17, wherein:

said plurality of fasteners including a wing nut and a carriage bolt.

* * * * *